US 6,669,395 B2

(12) United States Patent
Wu

(10) Patent No.: US 6,669,395 B2
(45) Date of Patent: Dec. 30, 2003

(54) CONNECTION STRUCTURE OF A LAMP TUBE

(76) Inventor: Wen-Chang Wu, 235 Chung-Ho, Box 8-24, Taipei (TW)

( * ) Notice: Subject to any disclaimer, the term of this patent is extended or adjusted under 35 U.S.C. 154(b) by 0 days.

(21) Appl. No.: 10/078,093

(22) Filed: Feb. 19, 2002

(65) Prior Publication Data

US 2003/0156897 A1 Aug. 21, 2003

(51) Int. Cl.[7] .................................................. F16B 7/00
(52) U.S. Cl. ....................... 403/286; 403/185; 403/299; 403/383; 403/408.1
(58) Field of Search ............................. 248/125.7, 159, 248/295.11; 411/410, 389; 403/83, 118, 164, 185, 200, 282, 285, 299, 292, 383, 408.1, 312, 349, 354, 362, 7, 286, DIG. 12

(56) References Cited

U.S. PATENT DOCUMENTS 4,729,707 A * 3/1988 Takahashi ................... 411/389
4,903,924 A * 2/1990 Rutsche et al. ............. 248/159
4,988,584 A * 1/1991 Shaper ......................... 429/50
5,702,197 A * 12/1997 Chen .......................... 403/166
5,759,206 A * 6/1998 Bassett ......................... 623/27
6,363,586 B1 * 4/2002 Neufingerl ................... 24/287

* cited by examiner

Primary Examiner—Lynn H. Browne
Assistant Examiner—Kenn Thompson

(57) ABSTRACT

A connection structure of a lamp tube comprises a multi-sectional lamp tube having a front lamp tube and a rear lamp tube, a locking rod engaged in the interior of the multi-sectional lamp tube, and a buffer structure engaged to a distal end of the locking rod. The locking rod is a polygonal embedding section and a distal end thereof has a threaded section. The threaded section of the locking rod is inserted into a resisting block of the front lamp tube and then is exactly locked to the locking seat of the rear lamp tube. The middle section of the locking rod has an embedding section. The embedding section has a resisting block. A buffer structure between the locking rod and the resisting block serves to form a tightening buffer section. Thereby, the front lamp tube and rear lamp tube can be adjusted to an aligned position.

5 Claims, 4 Drawing Sheets

CONNECTION STRUCTURE OF A LAMP TUBE

FIELD OF THE INVENTION

The present invention relates to connection structures, and particularly to a connection structure of a lamp tube which has a simple structure.

BACKGROUND OF THE INVENTION

The conventional connection structure of a lamp tube is engaged by male and female threads. The tube has threads. Therefore, in general, the tube has a round shape for forming threads, while other polygonal tubes are not suitable to be used as lamp tubes.

Therefore, a novel lamp tube is developed, where a protrusion with male thread is protruded from an end section of an upper lamp tube so as to be engaged with another lower lamp tube with female thread in the interior hollow section of the lower lamp tube. Thereby, the lamp tube may have a polygonal shape. However, as the male thread is tightly engaged with the female thread, the polygonal upper lamp tube can not align the lower lamp tube. As it is desired to align the upper and lower lamp tubes, it is possible that the two lamp tubes can not be tightly engaged.

SUMMARY OF THE INVENTION

Accordingly, the primary object of the present invention is to provide a connection structure of a lamp tube. The lamp tube comprises a multi-sectional lamp tube having a front lamp tube and a rear lamp tube, a locking rod engaged in the interior of the multi-sectional lamp tube, and a buffer structure engaged to a distal end of the locking rod. The locking rod is a polygonal embedding section and a distal end thereof has a threaded section, the threaded section of the locking rod is inserted into a resisting block of the front lamp tube and then is exactly locked to the locking seat of the rear lamp tube. The middle section of the locking rod has an embedding section. The embedding section has a resisting block. A buffer structure between the locking rod and the resisting block serves to form a tightening buffer section. Thereby, the front lamp tube and rear lamp tube can be adjusted to an aligned position.

The various objects and advantages of the present invention will be more readily understood from the following detailed description when read in conjunction with the appended drawing.

DETAILED DESCRIPTION OF THE PREFERRED EMBODIMENTS

Figure 1:
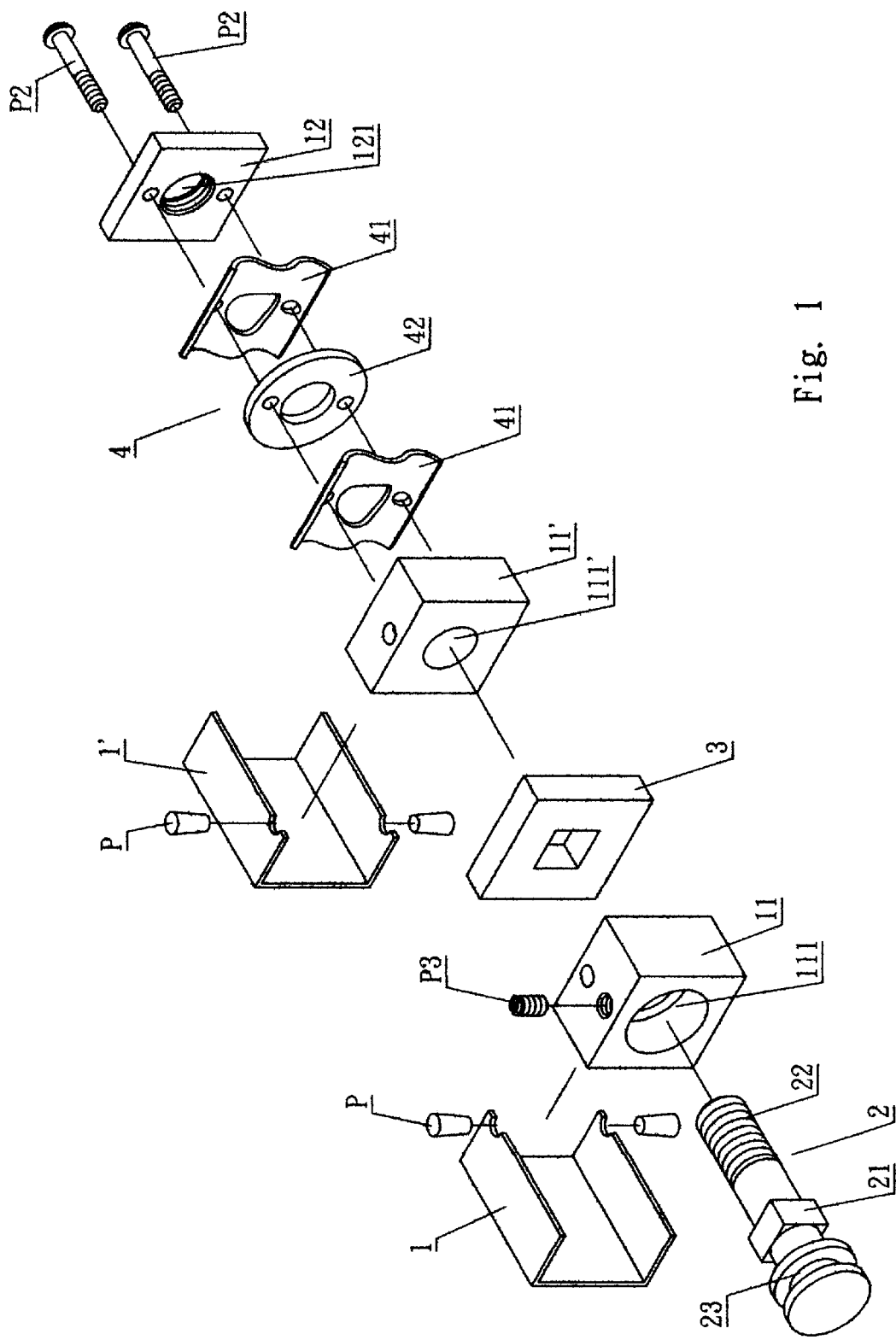
FIG. 1 is an exploded perspective view of the present invention.
Figure 2:
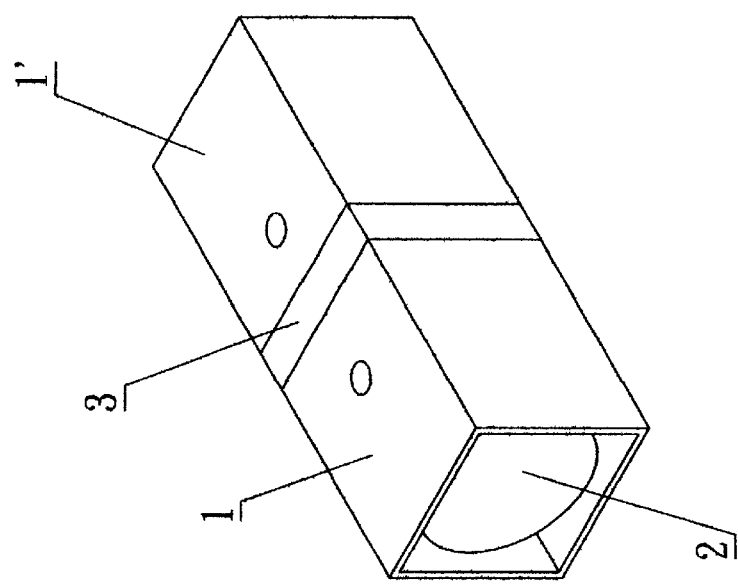
FIG. 2 is an assembled perspective view of the present invention.

Referring to FIGS. 1 and 2, the structure of the present invention is clearly shown. The connection structure of a lamp tube of the present invention is mainly formed by a multi-sectional lamp tube having a front lamp tube 1 and a rear lamp tube 1', a locking rod 2 engaged in the interior of the multi-sectional lamp tube 1, and a buffer structure engaged to a distal end of the locking rod 2.

The front lamp tube 1 of the multi-sectional lamp tube has a coupled end which is retained with a retaining block 11 by a pin P. A center of the retaining block 11 is formed with a through hole 111. Thereby, the locking rod 2 can be inserted into the through hole 111 and thus positioned therein. Moreover, a rear lamp tube 1' has a buffer structure 4 beside the retaining block 11. The lateral side of the buffer structure 4 has a locking seat 12. The locking seat 12 is locked to the retaining block 11 by a stud P2. A center of the locking seat 12 has a threaded hole 121. A threaded section 22 at a distal end of the locking rod can be inserted into the threaded hole 121. The retaining block 11 in the retaining block 11 is engaged to another end of the locking rod 2. A predetermined portion in the inner edge of the retaining block 11 is locked with a confining stud P3.

The locking rod 2 is a polygonal embedding section 21 and the distal end thereof has a threaded section 22. The threaded section 22 of the locking rod 2 is inserted into a resisting block 3 and then is exactly locked to the locking seat 12 of the rear lamp tube 1'. The inserted resisting block 3 is exactly buckled to the embedding section 21 of the locking rod 2, thereby, the locking rod 2 rotating with the resisting block 3 synchronously. A head portion of the locking rod 2 has a recess 23. The recess 23 exactly positions the confining stud P3 of the retaining block 11 so as to drive the front lamp tube 1 to resist against the rear lamp tube 1'.

Figure 5:
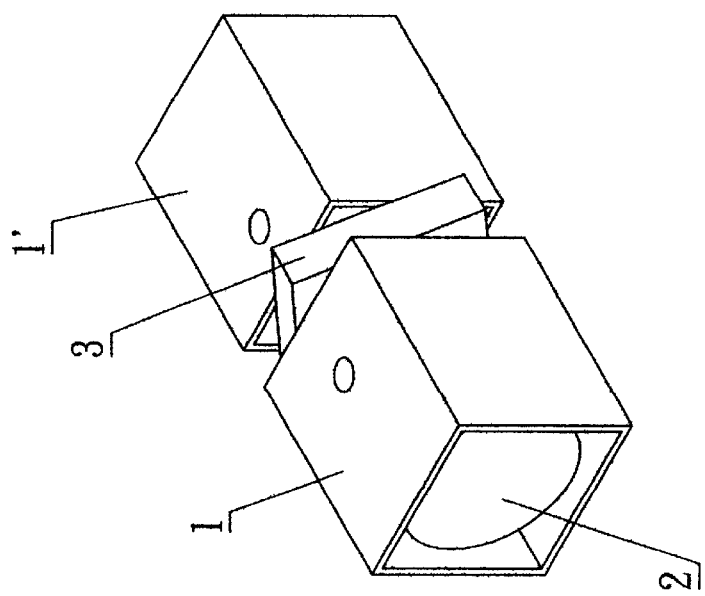
FIG. 5 is an assembled perspective view showing that the present invention is positioned properly.
Figure 4:
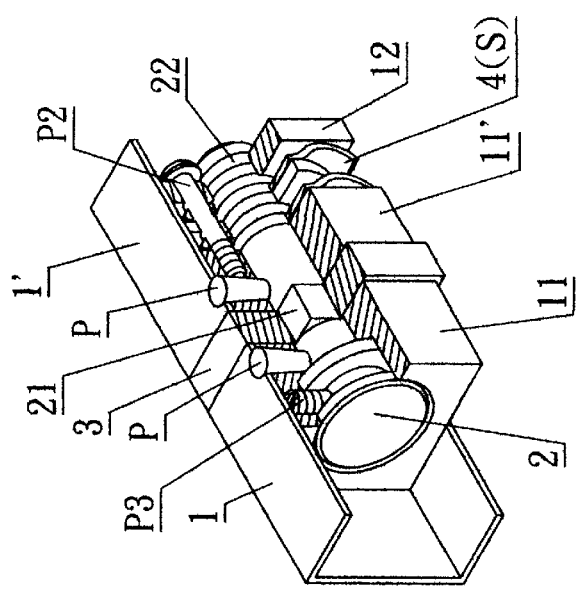
FIG. 4 is a cross sectional view showing that the present invention is in an aligned condition.
Figure 3:
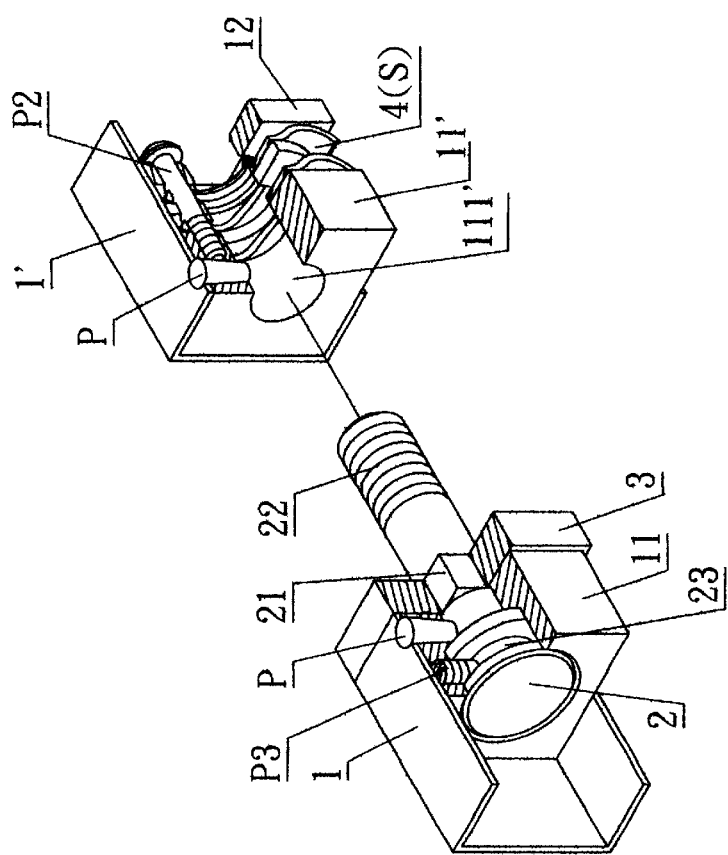
FIG. 3 is a cross sectional view showing the engaging condition of the present invention.

The buffer structure 4 has two symmetrical reeds 41 each having a protruding middle section and a washer 32 between the two reeds 41. The buffer structure 4 is exactly positioned between the retaining block 11 of the rear lamp tube 1' and the locking seat 12 so as to be formed with a tightening buffering region S. Referring to FIGS. 3 to 5, by a resisting block 3 to enclose the embedding section 21 of the locking rod 2, the threaded section 22 of the locking rod 2 to be locked to the locking seat 12, and an end of the locking seat 12 to be buckled to the recess 23 of the stud P3, the front lamp tube 1 is driven to move synchronously. When the resisting block 3 is rotated to drive the locking rod 2 to tightly resist against the rear lamp tube 1', the locking rod 2 is buckled by the confining stud P3 so as to drive the front lamp tube 1 synchronously to resist against the rear lamp tube 1'. Thereby, the front lamp tube 1 and rear lamp tube 1' are positioned properly (referring to FIGS. 3 and 4).

However, since the front lamp tube 1 has a polygonal structure, the edges of the front lamp tube 1 and the rear lamp tube 1' are generally not aligned (referring to FIG. 5). Thus, the resisting block 3 can be rotated continuously. The buffer structure 4 is retained between the retaining block 11 and the locking seat 12 so as to form a tightening buffer section S, thereby, the locking rod 2 being locked continuously and then resisting against the reeds 41 of the buffer structure 4 until the edges of the front lamp tube 1 and rear lamp tube 1' are aligned.

Figure 6:
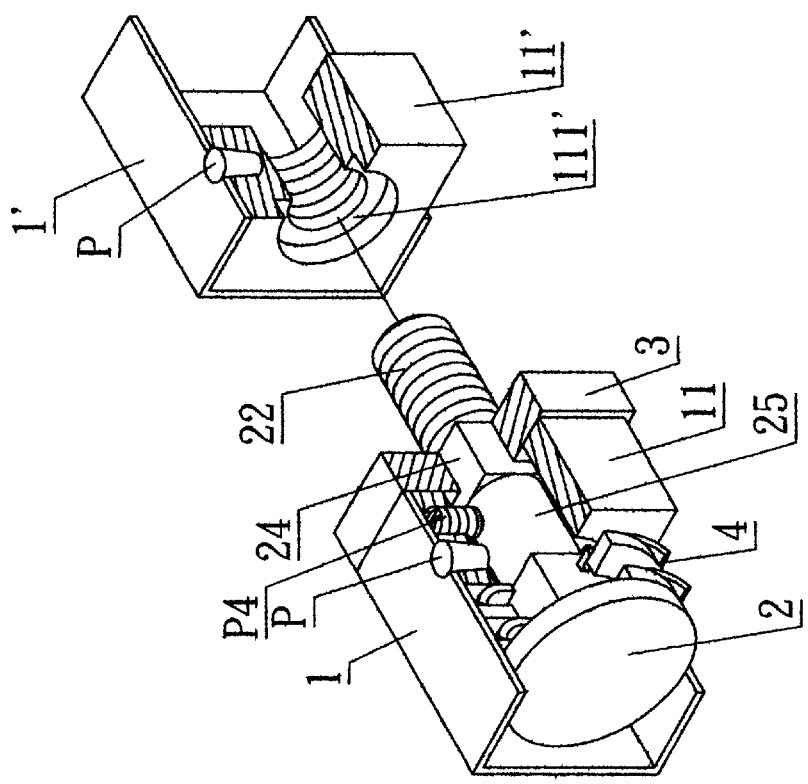
FIG. 6 shows another embodiment of the present invention.

Referring to FIG. 6, another embodiment of the present invention is illustrated. The retaining block 11 in the rear lamp tube 1' has a through hole 111 which serves for locking the threaded section 22 of the locking rod 2. The inner edge of the retaining block 11 is locked with a confining stud P4. The confining stud P4 exactly resists against a smaller neck portion 25 of the locking rod 2.

The locking rod 2 has a front polygonal embedding section 24 and has a threaded section 22 at a distal end thereof. The threaded section 22 of the locking rod 2 is inserted into a resisting block 3 and then is exactly locked to the retaining block 11 of the rear lamp tube 1'. The inserted resisting block 3 is exactly buckled to the embedding section 24 of the locking rod 2, thereby, the locking rod 2 rotating with the resisting block 3 synchronously. A middle section of the embedding section 24 of the locking rod 2 has a smaller neck portion 25. The smaller neck portion 25 serves for locking and positioning the confining stud P4 at the inner edge of the retaining block 11.

Figure 7:
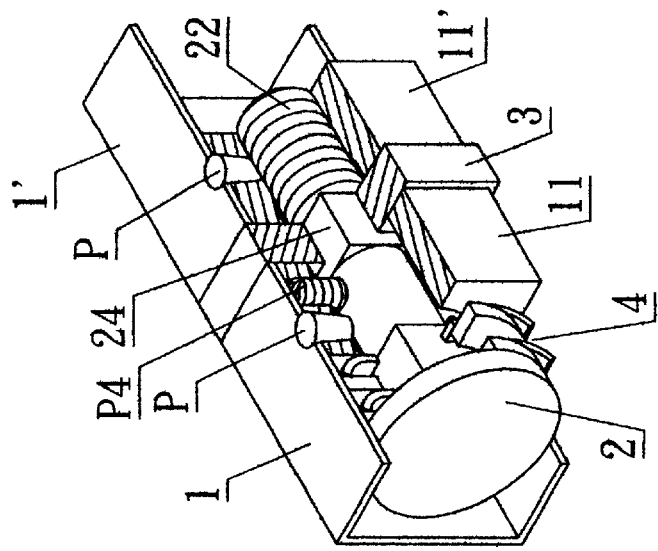
FIG. 7 shows a further embodiment of the present invention.

Referring to FIG. 7, when the resisting block 3 drives the locking rod 2 so as to tighten the rear lamp tube 1' with the front lamp tube 1. As the edges of the two lamp tubes can be not aligned, the resisting block 3 can be rotated continuously. When locking the lamp tube, the smaller neck portion 25 of the locking rod 2 has a margin for adjusting the orientation, as the locking rod 2 is locked continuously, the reeds of the buffer structure 4 will be compressed gradually until the edges of the front lamp tube 1 and rear lamp tube 1' are aligned.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A connection structure of a lamp tube comprising a multi-sectional lamp tube having a front lamp tube and a rear lamp tube, a locking rod engaged in an interior of the multi-sectional lamp tube, and a buffer structure engaged to a distal end of the locking rod; wherein the front lamp tube has a front retaining block; a center of the front retaining block having a front through hole; a rear lamp tube has a buffer structure beside a rear retaining block for forming a tightening buffer section; a bottom side of the buffer structure has a locking seat; the locking seat is locked to the rear retaining block; the locking seat has a threaded hole; a threaded section at a distal end of the locking rod has inserted into the threaded hole; a predetermined portion in an inner edge of the front retaining block is locked with a confining stud; and the locking rod is a polygonal embedding section; the threaded section of the locking rod is inserted into a resisting block and then is exactly locked to the locking seat of the rear lamp tube; the inserted resisting block is exactly buckled to the embedding section of the locking rod, thereby, the locking rod rotating with the resisting block synchronously; a head portion of the locking rod has a recess; the recess serves to exactly position the confining stud of the front retaining block so as to secure the front lamp tube to rest against the rear lamp tube;

the buffer structure has two spring washers and a buffer washer between the two spring washers; the buffer structure is exactly positioned between the rear retaining block of the rear lamp tube and the locking seat so as to be formed with the tightening buffer section;

thus, connection structure of a lamp tube having a simple structure is formed.

2. The connection structure of a lamp tube as claimed in claim 1, wherein the lamp tube has a polygonal tube body.

3. The connection structure of a lamp tube as claimed in claim 1, wherein a size of the embedding section of the locking rod is matched to an inner diameter of a lamp tube and has a polygonal shape.

4. The connection structure of a lamp tube as claimed in claim 1, wherein the rear retaining block positioned in the rear lamp tube is exactly engaged with the threaded section of the locking rod; a confining stud is installed at an inner edge of the front retaining block; the confining stud exactly rests against a smaller neck portion in a middle section of the embedding section of the locking rod; since the locking rod has a polygonal embedding section and a distal end thereof has a threaded section, after the locking rod passes through the resisting block, the threaded section is exactly locked to the rear retaining block of the rear lamp tube; and the resisting block is exactly buckled to the embedding section of the locking rod.

5. The connection structure of a lamp tube as claimed in claim 4, wherein the smaller neck portion serves for locking and positioning the confining stud at an inner edge of the front retaining block.

* * * * *